United States Patent
Sarpatwar et al.

(10) Patent No.: US 11,764,941 B2
(45) Date of Patent: Sep. 19, 2023

(54) DECISION TREE-BASED INFERENCE ON HOMOMORPHICALLY-ENCRYPTED DATA WITHOUT BOOTSTRAPPING

(71) Applicant: International Business Machines Corporation, Armonk, NY (US)

(72) Inventors: Kanthi Sarpatwar, Elmsford, NY (US); Nalini K. Ratha, Yorktown Heights, NY (US); Karthikeyan Shanmugam, Elmsford, NY (US); Karthik Nandakumar, Singapore (SG); Sharathchandra Pankanti, Darien, CT (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/863,767

(22) Filed: Apr. 30, 2020

(65) Prior Publication Data
US 2021/0344478 A1    Nov. 4, 2021

(51) Int. Cl.
*H04L 29/00* (2006.01)
*H04L 9/00* (2022.01)
(Continued)

(52) U.S. Cl.
CPC ............... *H04L 9/008* (2013.01); *G06N 3/08* (2013.01); *G06N 5/01* (2023.01); *G06N 5/04* (2013.01); *G06N 20/20* (2019.01); *H04L 9/30* (2013.01)

(58) Field of Classification Search
CPC .. H04L 9/008; H04L 9/30; G06N 3/08; G06N 5/003; G06N 5/04; G06N 20/20
See application file for complete search history.

(56) References Cited

U.S. PATENT DOCUMENTS 9,946,970 B2    4/2018   Gilad-Bachrach et al.
10,127,497 B2 * 11/2018  Eslami .................. G06N 20/10
(Continued)

FOREIGN PATENT DOCUMENTS

CN    109325584        2/2019
EP    3789924 A1 *     3/2021   ............. G06N 20/00
EP    3836041 A1 *     6/2021   ............. G06F 16/36

OTHER PUBLICATIONS

Wu, et al, "Privately evaluating decision tress and random forests," Proceedings on Privacy Enhancing Techniques: 2016 (4) 335-355.
(Continued)

*Primary Examiner* — Don G Zhao
(74) *Attorney, Agent, or Firm* — Jeffrey S. LaBaw; David H. Judson

(57) ABSTRACT

A method, apparatus and computer program product for homomorphic inference on a decision tree (DT) model. In lieu of HE-based inferencing on the decision tree, the inferencing instead is performed on a neural network (NN), which acts as a surrogate. To this end, the neural network is trained to learn DT decision boundaries, preferably without using the original DT model data training points. During training, a random data set is applied to the DT, and expected outputs are recorded. This random data set and the expected outputs are then used to train the neural network such that the outputs of the neural network match the outputs expected from applying the original data set to the DT. Preferably, the neural network has low depth, just a few layers. HE-based inferencing on the decision tree is done using HE inferencing on the shallow neural network. The latter is computationally-efficient and is carried without the need for bootstrapping.

25 Claims, 4 Drawing Sheets

(51) Int. Cl.
*G06N 20/20* (2019.01)
*G06N 3/08* (2023.01)
*G06N 5/04* (2023.01)
*H04L 9/30* (2006.01)
*G06N 5/01* (2023.01)

(56) References Cited

U.S. PATENT DOCUMENTS

| | | | | |
|---|---|---|---|---|
| 11,031,111 | B1* | 6/2021 | Limoli | G16H 10/60 |
| 11,169,288 | B1* | 11/2021 | Johnson | G01V 1/306 |
| 2007/0076016 | A1* | 4/2007 | Agarwala | G06T 3/4038 |
| | | | | 345/629 |
| 2007/0140479 | A1* | 6/2007 | Wang | H04L 9/30 |
| | | | | 380/30 |
| 2009/0096808 | A1* | 4/2009 | Winn | G06T 11/60 |
| | | | | 345/619 |
| 2013/0147911 | A1* | 6/2013 | Karsch | H04N 13/261 |
| | | | | 348/43 |
| 2014/0140514 | A1* | 5/2014 | Gentry | H04L 9/008 |
| | | | | 380/281 |
| 2016/0182558 | A1* | 6/2016 | Tripp | G06F 21/562 |
| | | | | 726/25 |
| 2016/0314613 | A1* | 10/2016 | Nowozin | G01S 7/497 |
| 2017/0344646 | A1* | 11/2017 | Antonopoulos | H04L 63/205 |
| 2018/0359078 | A1* | 12/2018 | Jain | H04L 63/0428 |
| 2019/0065974 | A1* | 2/2019 | Michigami | G06N 3/084 |
| 2019/0155643 | A1* | 5/2019 | Bhageria | G06F 9/5038 |
| 2019/0258953 | A1* | 8/2019 | Lang | G06N 3/0454 |
| 2020/0019867 | A1 | 1/2020 | Nandakumar et al. | |
| 2020/0036510 | A1* | 1/2020 | Gomez | H04L 9/0825 |
| 2020/0311542 | A1* | 10/2020 | Wang | G06F 16/3347 |
| 2020/0372400 | A1* | 11/2020 | Carreira-Perpiñán | |
| | | | | G06N 20/00 |
| 2021/0133577 | A1* | 5/2021 | Srinivasan | G06N 3/063 |
| 2021/0182698 | A1* | 6/2021 | Le Biannic | G06N 20/00 |
| 2021/0209247 | A1* | 7/2021 | Mohassel | A63B 21/222 |
| 2021/0235293 | A1* | 7/2021 | Chen | H04W 24/08 |
| 2021/0241166 | A1* | 8/2021 | Horesh | G06F 21/602 |
| 2021/0264320 | A1* | 8/2021 | Parnell | G06N 7/005 |

OTHER PUBLICATIONS

Tueno, et al, "Non-interactive private decision tree evaluation," arXiv:1909.08362v1 [cs.CR] Sep. 18, 2019.

Xiao, et al, "Privacy-preserved approximate classification based on homomorphic encryption," Mathematical and Computational Applications, MDPI, 2019.

Joye, et al, "Private yet efficient decision tree evaluation," Data and Applications Security and Privacy XXXII, Jul. 10, 2018, Abstract Only.

Bost, et al, "Machine learning classification over encrypted data," NDSS 2015.

Truex, et al, "Privacy-preserving inductive learning with decision trees," BigData Congress 2017: 57-64, Abstract Only.

Tandel, et al, "Privacy-preserving decision tree classification on horizontally partitioned data," Computer Science International Journal of Engineering Research and Technology, 2016.

Hesamifard, et al., "Deep Neural Networks Classification over Encrypted Data," Proceedings of the Ninth ACM Conference On Data and Application Security and Privacy Mar. 25, 2019, pp. 97-108.

Bucila, et al., "Model compression," Proceeding of the Twelfth ACM SIGKDD International Conference on Knowledge Discovery and Data Mining, Aug. 20, 2006, pp. 535-541.

Sarpatwar, et al., "Efficient Encrypted Inference on Ensembles on Decision Trees," Cornell University Library, Mar. 5, 2021.

* cited by examiner

DECISION TREE-BASED INFERENCE ON HOMOMORPHICALLY-ENCRYPTED DATA WITHOUT BOOTSTRAPPING

BACKGROUND OF THE INVENTION

Technical Field

This disclosure relates generally to the use of fully homomorphic encryption operations to facilitate inferencing against encrypted data.

Background of the Related Art

A "decision tree" is a common decision support model for many applications. A decision tree (DT) is a flowchart-like structure of nodes, wherein each internal node represents a test on an attribute, each branch represents the outcome of the test, and each leaf node represents a class label (decision taken after computing all attributes). The paths from root to leaf represent classification rules. The decision tree may be trained on a data set and results in corresponding regression outputs.

There are many scenarios where the data needed for training a decision tree regression model of this type is sensitive, such as when the model belongs to some organization but cannot be shared outside. For example, credit card transaction information is available with the credit card company but not for an ordinary user. Similarly, healthcare data related to patients is available in a hospital but not for a researcher to find patterns in the data for understanding cancer progression. Moreover, privacy concerns (such as the new European data privacy regulation GDPR) may restrict the availability of data. Similar situations arise where competitors would like to pull their data to build accurate models (such as different banks having data relating to the transactions and wanting to build fraud detection models). Restricting the availability of data may prevent otherwise useful models from being used, or degrade their performance.

To address these privacy concerns, it is known in the prior art to provide machine learning-as-a-service (MLaaS) solutions wherein a trained model of this type is hosted on a cloud server, and the hosting cloud server, as a service, allows users to run inference queries on the model. This notion is sometimes referred to as privacy preserving inference, and its goal is that it provides a secure way for users to maintain the privacy of the scoring point data returned by the model, while also enabling the cloud provider to protect the model's privacy, e.g., for proprietary, regulatory or other reasons. Example use cases include: a hospital training a model (e.g., to predict possibility of disease) while desiring to provide scoring services with rigid privacy constraints due to data sensitivity; and, a financial credit scoring firm training a credit-risk model and providing a scoring service, likewise with rigid privacy constraints due to legal or regulatory requirements. To this end, these types of solutions implement an advanced cryptographic technique known as fully homomorphic encryption (FHE), which provides a way to enable secure computation on client data without the need to decrypt it at the model, while concurrently preserving the secrecy of the model itself.

While homomorphic encryption provides significant advantages, decision tree-base models do not lend themselves to being processed efficiently using FHE techniques. This problem arises (in the FHE context) because the basic operation performed at a model node is a comparison of two values, and this comparison (when performed using FHE) is a non-linear operation (e.g., using a sigmoid function $f(x) = 1/(1+e^{-x})$). As a consequence, the comparisons are fuzzy, and further because scaling is difficult as scaling factors are non-uniform. As such, these branching computations are not practical to implement in a fully homomorphic encryption scheme, and thus it remains a challenge to provide FHE-based inferencing on decision trees.

BRIEF SUMMARY

This disclosure addresses and solves this problem. In lieu of performing homomorphic inference on the DT model itself, the approach herein substitutes a specially-trained low depth neural network (NN) for the DT model, and the homomorphic inferencing is then carried out on the neural network. In this manner, the neural network is a surrogate or proxy for the DT model, and the untenable branching computations normally required by inferencing against the DT model are avoided.

To this end, and according to this disclosure, the neural network is trained to learn the decision boundary of the DT tree. This operation is carried out by the DT model owner in the clear (in plaintext), and preferably the neural network training is done without using the original data training points used for the DT model itself. In this training phase, a random data set is applied to the DT, and their expected outputs (from applying the tree) are obtained. The distribution characteristics (e.g., minimum and maximum values, feature-wise mean and variance, etc.) of the random data set match distribution characteristics of the original data set. This random data set and their expected outputs are then used to train the neural network such that the outputs of the neural network match the outputs that would be expected from applying the original data set to the DT. Preferably, the neural network has low depth (e.g., less than about three (3) layers) and thus is sometimes referred to herein as being "shallow." Once trained, and in lieu of inferencing directly against the DT, the inferencing is then carried out against the shallow neural network. In other words, HE-based inferencing on the decision tree is done using HE inferencing on the shallow neural network. The latter is computationally-efficient and is carried without the need for bootstrapping.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
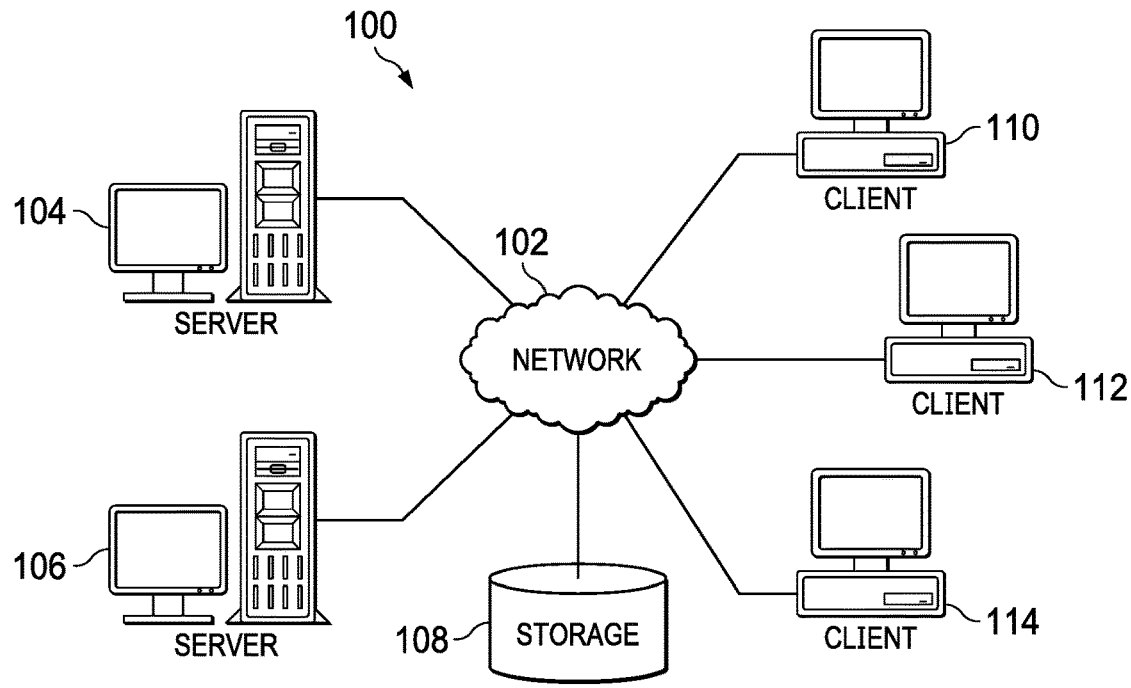
FIG. 1 depicts an exemplary block diagram of a distributed data processing environment in which exemplary aspects of the illustrative embodiments may be implemented.
Figure 2:
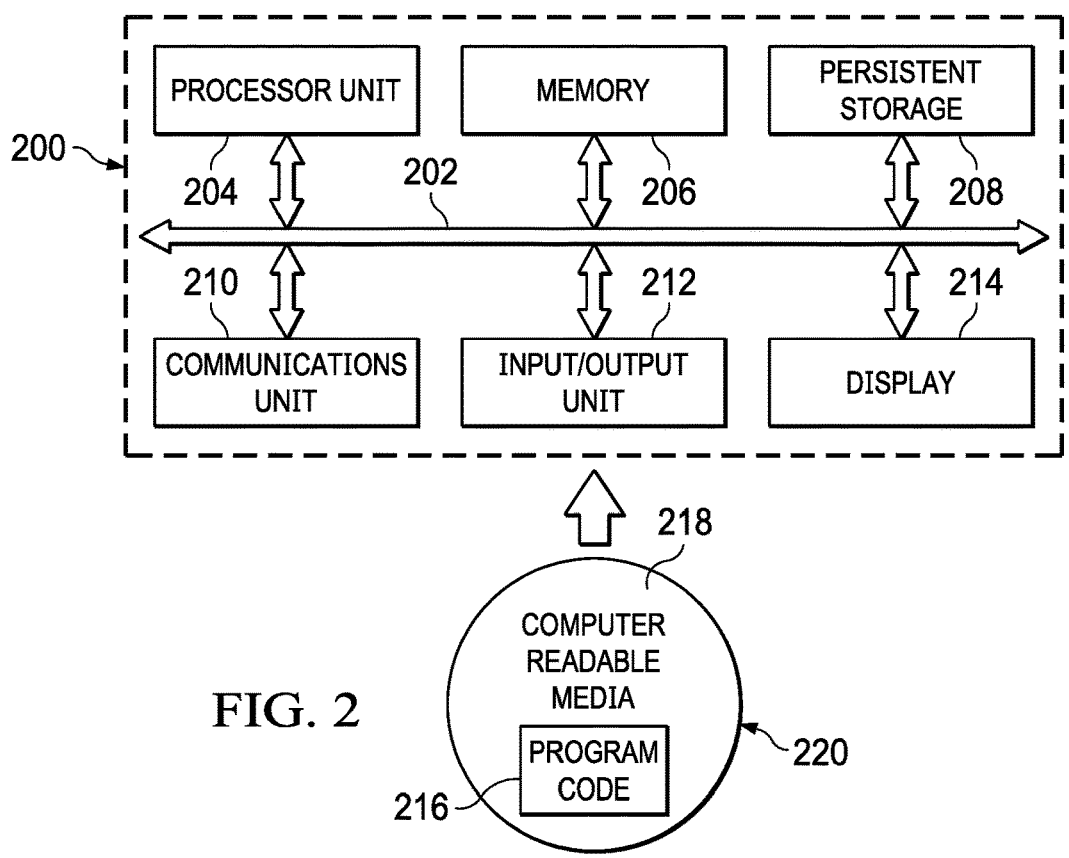
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
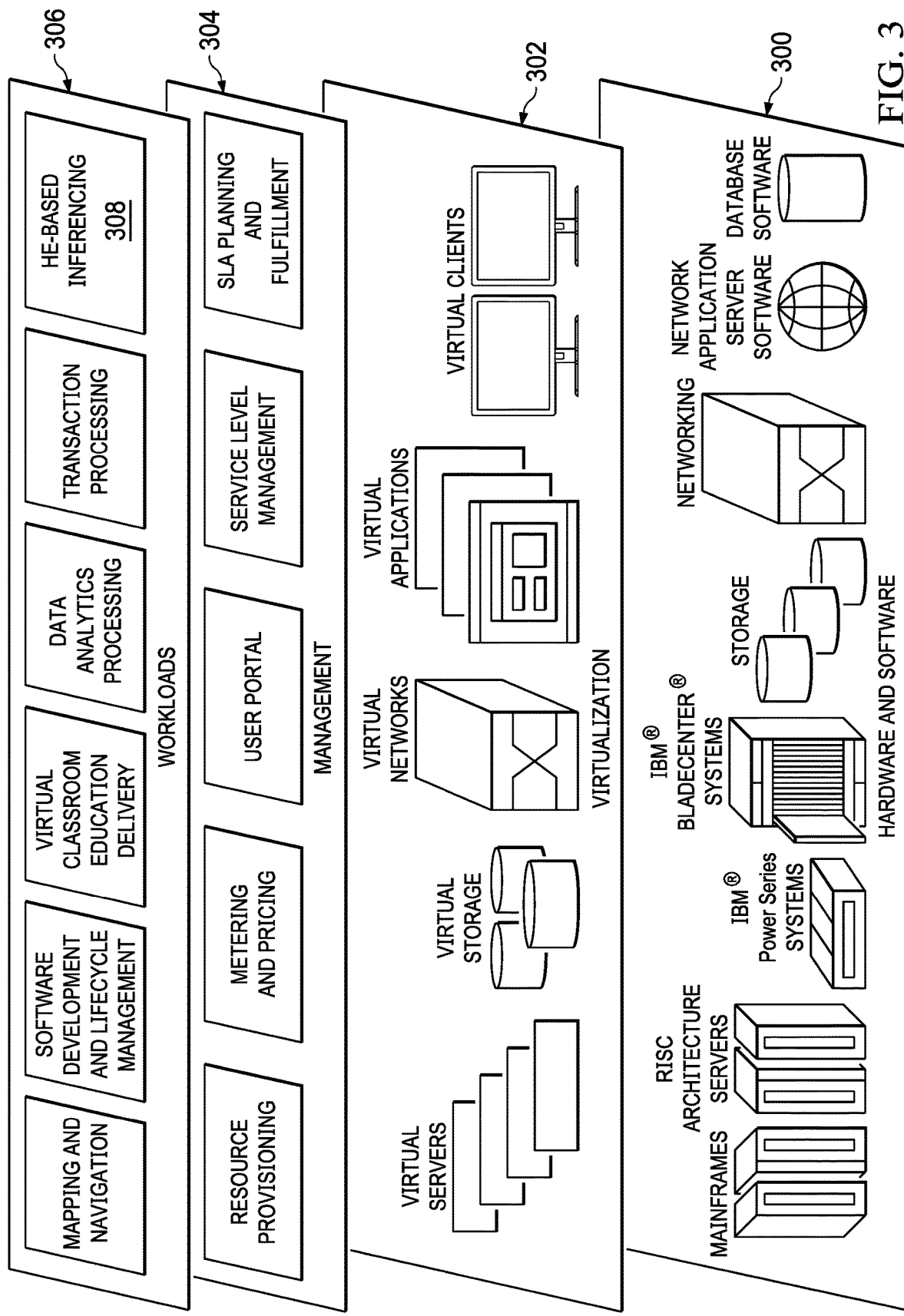
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, a technique for privacy-preserving homomorphic inferencing on homomorphically-encrypted data 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

The above-described commercial implementation is not intended to be limited, but rather is simply one representative embodiment of a client application supported in a cloud computing environment and that interacts with a cognitive service.

Homomorphic Encryption

Homomorphic encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Homomorphic encryption may be partially, somewhat or fully homomorphic. Partially homomorphic encryption (PHE) schemes are homomorphic with respect to only one type of operation, for example, addition or multiplication. Somewhat homomorphic encryption (SWHE) supports homomorphic operations with respect to multiple operations, for example, addition and multiplication, but not all operations. Fully homomorphic encryption (FHE) supports an unbounded number of homomorphic operations on ciphertexts, and it is more powerful than PHE and SWHE. Toolkits for implementing homomorphic encryption are known. A well-known toolkit is HElib, an open-source project that implements a Stochastic Gradient Descent (SGD)-based training of a neural network. The current version of HElib supports addition and multiplication operations of arbitrary numbers in binary representation, using encryption of the individual bits.

Representative HE protocol implementations may be based on one or more cryptographic protocols including, without limitation, unpadded RSA, El-Gamal, Benaloh, Paillier, and others. As will be described, the techniques of this disclosure do not require any particular HE implementation.

Machine Learning-as-a-Service Using Homomorphic Encryption

Figure 4:
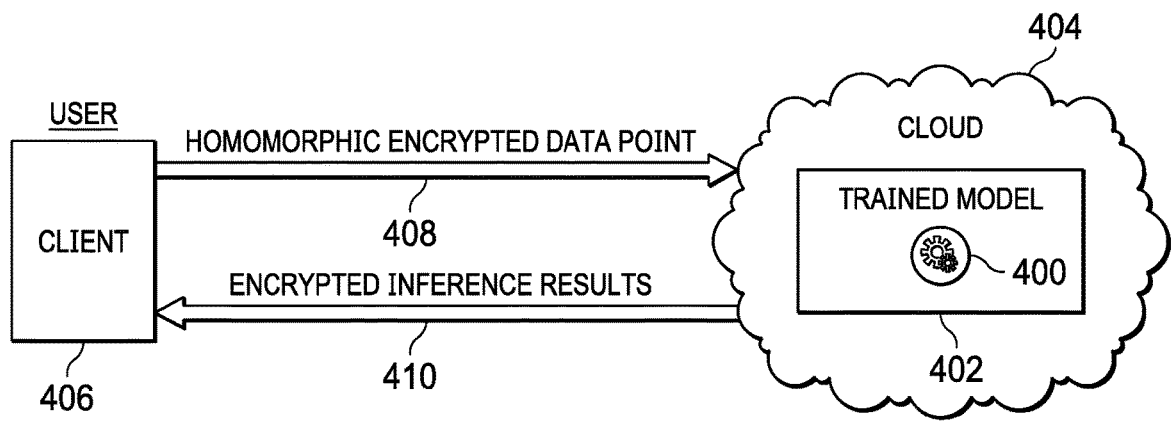
FIG. 4 is a representative Machine Learning as-a-service (MLaaS) operating environment in which the techniques of this disclosure may be implemented.

With reference now to FIG. 4, the basic operating environment for the technique herein is depicted. As shown, in a typical ML as a service scenario, a trained model 400 is hosted on a cloud server 402 in a cloud computing infrastructure 404 such as described above. The trained model 400 may be exposed as an Application Programming Interface (API) on the cloud 404. In operation, and as a service, the hosting cloud server 402 allows users to run inference queries on the model 400. Typically, a user is associated with a client machine 406, and the client and server are configured to operate according to the client-server model previously described. A homomorphic encryption (HE) protocol is enforced across the client-server operating environment such that the cloud protects the model's privacy while users (clients) maintain the privacy of the scoring data points returned by the model. In a typical request-response workflow, the client 406 sends an encrypted query 408 (e.g., a data point) to the cloud server 402, the cloud server 402 applies the model and then returns a response 410. The response includes the encrypted inference results. In this manner, privacy-preserving inference problems are securely evaluated.

While the above approach works well to preserve the respective privacy interests of both the requesting user and the cloud provider hosting the model, this type of inferencing is computationally-inefficient for decision tree-based models.

Decision Tree-Based Inferences on Homomorphic-Encrypted Data without Bootstrapping With the above as background, the technique of this disclosure is now described. As noted above, HE-based inferencing is inefficient when the model in question is a decision tree (or an ensemble of decision trees). To address this inefficiency, and in lieu of performing homomorphic inference on the DT model itself, the approach herein substitutes a specially-trained neural network (NN) for the DT model, and the homomorphic inferencing is then carried out on the neural network. In this manner, the neural network is a surrogate or proxy for the DT model, and the computational inefficiencies (namely, untenable branching computations) normally encountered by inferencing against the DT model are avoided.

To this end, and according to this disclosure, the neural network is trained to learn the decision boundary of the DT tree (or of each such tree is an ensemble of trees are to be modeled). Preferably, this operation is carried out by the DT model owner in the clear (in plaintext), and the training is done without using the original data training points used for the DT model itself. In this training phase, a random data set—but with distribution characteristics matching those of the original training data (for the tree)—is applied to the DT, and their expected outputs (from applying the tree) are obtained. This random data set and their expected outputs are then used to train the neural network such that the outputs of the neural network match the outputs that would be expected from applying the original data set to the DT. Preferably, the neural network has low depth (e.g., less than about three (3) layers), although using a particular number of layers is not a requirement. The notion of the neural network having low depth is sometimes referred to herein as being "shallow." Once a neural network of this type is trained, and in lieu of inferencing directly against the DT, the inferencing is then carried out against the shallow neural network. Thus, in the context of FIG. 4, the "trained model" 400 is actually the shallow neural network as opposed to the decision tree (or ensemble of decision trees). HE-based inferencing on the NN is much more computationally-efficient and is carried without the need for bootstrapping.

Figure 5:
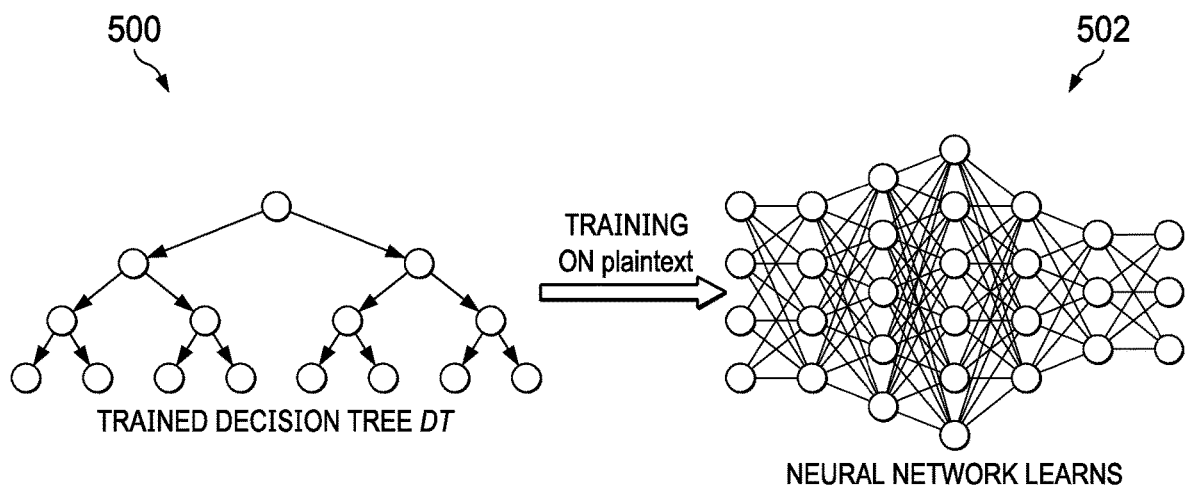
FIG. 5 depicts the technique of this disclosure wherein a low-depth neural network is trained to learn the decision boundaries of a decision tree of interest, thereby enabling the NN to be used as a proxy for HE-inferencing against the decision tree.

FIG. 5 depicts the basic technique of this disclosure for building and training the shallow neural network that is used as the proxy or surrogate for the decision tree (or ensemble of trees) of interest. As depicted, trained decision tree 500 represents the model of interest. It is a trained on a data set, which is sometimes referred to herein as the original data set. More formally, the model is a trained decision tree regression model DT on a data set D. Also shown is an output, which is a "shallow" neural network 502 that learns the decision boundaries of DT, preferably in the following manner. In a first step, a random training data set D' is computed. The random training set has a domain that resembles D, e.g., the minimum and maximum feature values are close for D and D'. More generally, the decision tree 500 is annotated with relevant training data statistics (by virtue of being pre-trained) with the original data set D. The training data statistics may vary but typically include minimum and maximum values for each feature, mean, variance, and the like. The particular nature and type of the training data statistics may vary, and it is assumed that a data generator (described below) is available to randomly generate the data set D' using the annotated training data statistics. In a second step, the data set D' is applied to the decision tree. This decision tree inference on D' preferably is performed in plaintext space (i.e. in the clear) and results in corresponding regression outputs $\hat{Y}$. Thereafter, and in a third step, a shallow neural network N is trained on the data set D' with $\hat{Y}$ as targets. Following training, inferencing is then carried out using N to answer an encrypted inference query for a test point x on DT, namely as follows: Enc(DT) (Enc(x))≈Enc(N)(Enc(x)). The encrypted inference results are then returned to the requesting client to complete the evaluation.

Thus, according to the technique described, a shallow neural network (NN) is trained to learn the decision boundary of the tree. Preferably, this training is done by the model owner and in the clear, and without using the original training data points. In this manner, homomorphic evaluation of the tree is then approximated by performing homomorphic inference on the neural network. This evaluation is highly-efficient, as the network preferably is shallow (e.g., an input layer, an output layer, and two (2) hidden layers), and it can be done without bootstrapping. In this manner, the technique avoids the untenable branching computations that would otherwise be required if the HE inferencing were required to be done on the non-linear comparisons in the decision tree itself. As a by-product, and because scaling is not required, the scaling issues associated with inferencing on the decision tree itself also are overcome.

Figure 6:
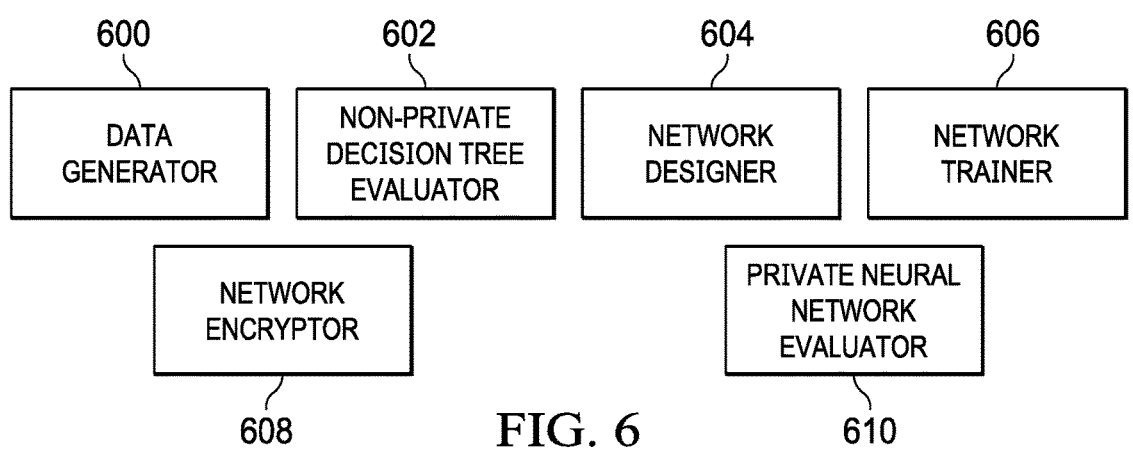
FIG. 6 is a block diagram depicting a set of high level functions that comprise a system for privacy-preserving HE-based inferencing with respect to a decision tree according to this disclosure.

FIG. 6 depicts a block diagram of a representative computing system that implements the above-described functionality. In a typical implementation, these components are implemented in the cloud compute infrastructure, e.g., as computer software executed on one or more processors (whether physical or virtual). As shown, system 600 comprises a data generator 602, a non-private decision tree evaluator 604, a network designer 606, a network trainer 608, a network encryptor 610, and a private evaluator 612. One or more of these components may be combined with one another, and the above-identified nomenclature is not intended to be limited. Data generator 602 has the primary function of randomly-generating the random data set D' using the annotated training data statistics from the original data set used to pre-train the decision tree. The non-private decision tree evaluator 604 computes predicated outputs for the random data set on the decision tree (or on each decision tree of an ensemble of such trees). The network designer 606 constructs the neural network N for the decision tree (or a NN for each decision tree in an ensemble model). The network trainer 608 trains the neural network N (or each such NN in an ensemble model) using the randomly-generated data set and the corresponding predicted outputs AY (which is also a decision tree). As noted above, the network trainer 608 trains the shallow neural network to learn the decision boundary of the decision tree (or each decision tree in the ensemble of decision trees). The network encryptor 610 performs homomorphic encryption for each N. During the process, the network encryptor 610 encrypts the shallow network using the public key of the client. Finally, the private evaluator 612 performs the homomorphic inference on the network N on one or more user-provided HE-data point(s) and returns the encrypted results (an encrypted prediction) to the user.

Without intending to be limiting, preferably the shallow neural network is trained in the clear on the randomly-generated data to learn the decision boundary of the decision tree of interest. HE inferencing on a two hidden layer N is one representative, but non-limiting embodiment, as such inferencing is done efficiently using HElib, once again without the need for bootstrapping. Experimental analysis has shown that on sample regression dataset, HE inference error is within 2-3% of the non-private counterpart, and that amortized runtime is in the range of 50-300 milliseconds per point depending on the number of decision trees in the ensemble and the complexity of the NN used.

Figure 7:
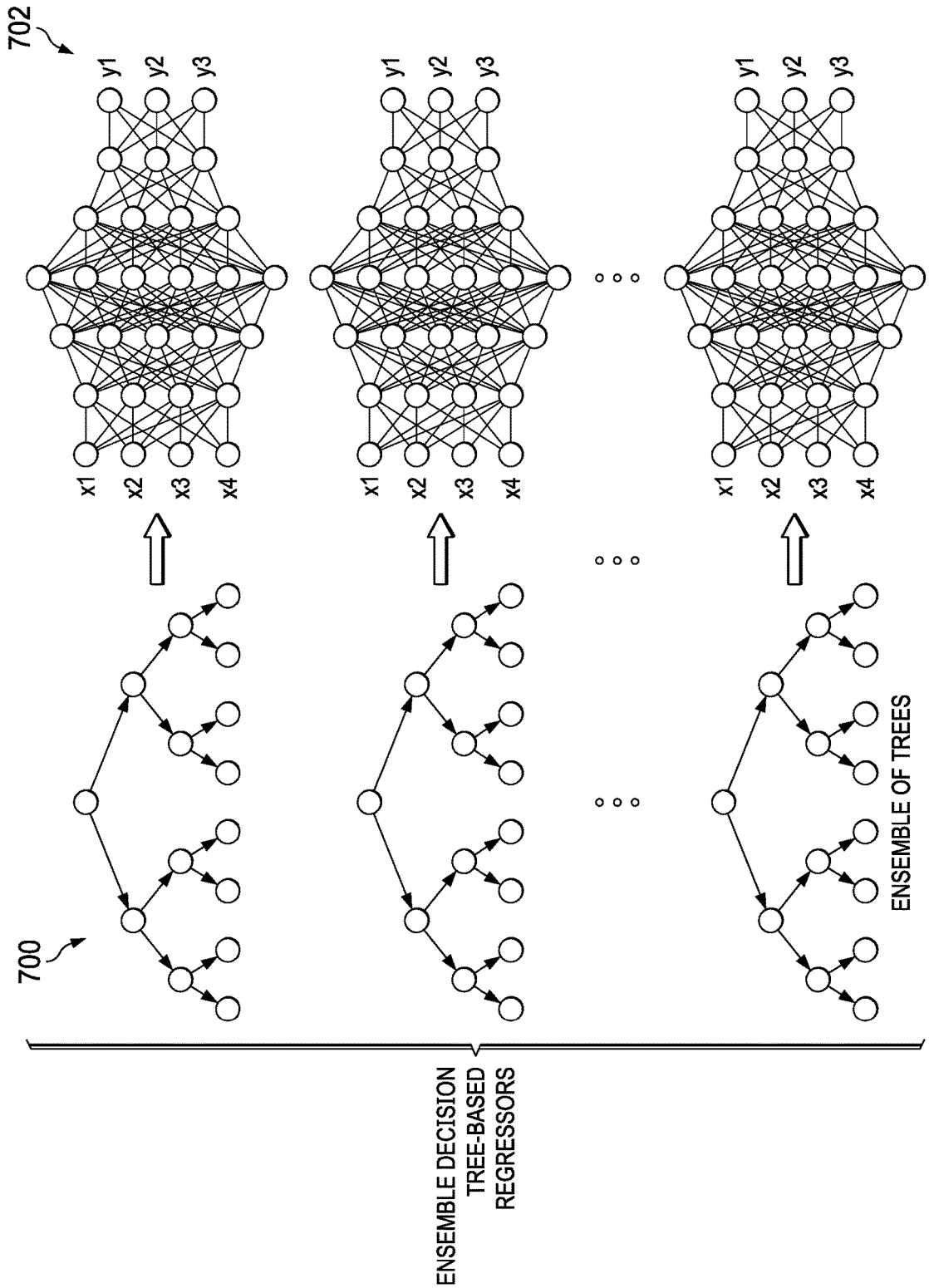
FIG. 7 depicts how the technique of this disclosure is extended to facilitate privacy-preserving homomorphic inferencing against an ensemble of decision trees.

FIG. 7 depicts a representative embodiment for a decision-tree based model that is an ensemble of decision trees. Ensemble decision tree-based regressors are of various known types including, without limitation, adaptive boost regressors, random forest regressors, and gradient boost regressors. In this embodiment, there is an ensemble of trees 700, with each tree having an associated shallow neural network 702, as previously described. More formally, and given a trained ensemble of trees $E_{dt}=(DT_1, DT_2, \ldots, DT_k)$, an output using the single tree approach to obtain an ensemble of neural nets $E_{nn}=(N_1, N_2, \ldots, N_k)$ for the ensemble of trees $(DT_1, DT_2, \ldots, DT_k)$, then an inference is provided as an aggregation on the individual tree inferences, e.g., for gradient boost: $Enc(E_{dt})(Enc(x)) \approx Enc(E_{nn})(Enc(x)) = \Sigma_i$ is a member of $[k]$ $Enc(N_i)(Enc(x))$. The above equation is not intended to be a general solution, as different ensemble methods aggregate different characteristics, e.g., adaptive boost (median), random forest (mean), and so forth.

The technique of this disclosure provides significant advantages. As has been described, the approach herein provides for a way to provide privacy-preserving inference on a pre-trained decision tree (in particular, an ensemble decision-tree based regression model), but in a computationally-efficient manner. The approach leverages the notion of training a shallow neural network that learns the decision boundary of the tree, with homomorphic evaluation of the tree then approximated by instead performing homomorphic inference on the neural network. Because HE-inferencing on the neural network is efficient, the approach herein does not require bootstrapping.

Although the approach described above preferably assumes the availability of full training data, this is not a requirement, as the technique may also be implemented in use cases where the decision model is already available without the full training data, or where only limited training data is available. A decision tree may be pre-existing and available, or it be accessible from another source. As noted above, the training data used for training the original decision tree may not be available (in whole or in part). The task of creating datasets for training the neural network should accommodate these different scenarios. Absolute randomness is unproductive and inefficient, as most of the resulting labels may be negative (and thus not useful). To limit this, and has been described, the synthetic dataset used for NN training should mimic the original data distribution. In general, a first order approximation to a distribution is based on mean and variance of the original data. As has also been described, other statistics like (e.g., min, max) are another minimal descriptor of the original training data to guide the generation of synthetic data at least within the range of features expected in the decision tree. Without limiting the foregoing, any other statistical techniques that generate meaningful labels in the process may also be used.

As described, typically a computing system that implements this approach is implemented in software, e.g., as a set of computer program instructions executed by one or more hardware processors. A particular tool or component in the system may comprise any number of programs, processes, execution threads, and the like, together with appropriate interfaces and databases to support data used or created by the tool or component. The tool or component may be configured or administered with a web-based front-end, via a command line, or the like. The tool or component may include one or more functions that are implemented programmatically, or that interoperate with other computing entities or software systems via an application programming interface (API), or any convenient request-response protocol.

Any references herein to one or more commercial products or services are exemplary and should not be taken to limit the disclosed technique, which may be implemented on any system, device, appliance (or, more generally, machine) having the general characteristics and operating functionality that has been described.

As noted, one preferred implementation of this subject matter is as-a-service, but this is not a limitation either. HE-based inferencing may be carried out entirely on-premises or in a standalone operating environment. As previously noted, and without limitation, the subject matter may be implemented within or in association with a cloud deployment platform system or appliance, or using any other type of deployment systems, products, devices, programs or processes. As has been described, the model building or inferencing system functionality may be provided as a standalone function, or it may leverage functionality from other products and services.

A representative cloud application platform with which the technique may be implemented includes, without limitation, any cloud-supported application framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Further, FHE is just a representative cryptographic protocol, and it is not intended to be limited.

Moreover, while inferencing preferably occurs using an HE protocol, the approach herein of using a surrogate neural network in lieu of the actual decision tree itself (for model evaluation) may be leveraged with other multi-party secure computation techniques and privacy of the test point, the model, or both, desired to be preserved.

The techniques herein provide for improvements to another technology or technical field, namely, HE-based inferencing tools and systems, and cloud-based systems that incorporate or expose such technologies, as well as improvements to the computational efficiency of HE systems and methods.

The particular use case or application for which the decision tree is being used in not a limitation of this disclosure.

Having described the subject matter, what is claimed is as follows:

1. A method for privacy-preserving homomorphic inferencing with respect to a decision tree, comprising:
   training a neural network model to learn one or more decision boundaries of the decision tree, the neural network model having low depth and being trained without requiring access to a data set originally used to train the decision tree; and
   performing cryptographic-based homomorphic inferencing on the low depth neural network model in lieu of the decision tree;
   wherein performing cryptographic-based homomorphic inferencing includes:
      encrypting the neural network model with a public key of a client;
      receiving from the client an encrypted inference query;
      applying the encrypted neural network model to the encrypted inference query without decrypting the query; and
      returning to the client, as a response to the encrypted inference query, an encrypted result.

2. The method as described in claim 1 wherein training the neural network model comprises:
   applying a random data set to the decision tree, the random data set matching distribution characteristics of the data set, and obtaining corresponding regression outputs from applying the random data set; and
   using the random data set and the regression outputs to train the neural network model;
   wherein, following the training, outputs from the trained neural network model substantially match outputs expected to be obtained from applying the data set to the decision tree.

3. The method as described claim 2 wherein the distribution characteristics comprise training statistics.

4. The method as described in claim 3 wherein the training statistics are one of: a minimum feature value, a maximum feature value, a feature-wise mean, and a variance.

5. The method as described in claim 1 wherein the decision tree is an ensemble of decision trees.

6. The method as described in claim 5 wherein the ensemble is one of: an adaptive boosting regressor, a random forest regressor, and a gradient boosting regressor.

7. The method as described in claim 1 wherein the homomorphic inferencing includes:
   hosting the encrypted neural network model in a cloud computing environment.

8. An apparatus, comprising:
   a processor;
   computer memory holding computer program instructions executed by the processor, the computer program instructions configured to provide privacy-preserving homomorphic inferencing with respect to a decision tree, the computer program instructions configured to:
      train a neural network model to learn one or more decision boundaries of the decision tree, the neural network model having low depth and being trained without requiring access to a data set originally used to train the decision tree; and
      perform cryptographic-based homomorphic inferencing on the low depth neural network model in lieu of the decision tree;
      wherein performing cryptographic-based homomorphic inferencing includes:
         encrypting the neural network model with a public key of a client;
         receiving from the client an encrypted inference query;
         applying the encrypted neural network model to the encrypted inference query without decrypting the query; and
         returning to the client, as a response to the encrypted inference query, an encrypted result.

9. The apparatus as described in claim 8 wherein the computer program instructions configured to train the neural network model are further configured to:
   apply a random data set to the decision tree, the random data set matching distribution characteristics of the data set, and to obtain obtaining corresponding regression outputs from applying the random data set; and
   use the random data set and the regression outputs to train the neural network model;
   wherein, following the training, outputs from the trained neural network model substantially match outputs expected to be obtained from applying the data set to the decision tree.

10. The apparatus as described claim 9 wherein the distribution characteristics comprise training statistics.

11. The apparatus as described in claim 10 wherein the training statistics are one of: a minimum feature value, a maximum feature value, a feature-wise mean, and a variance.

12. The apparatus as described in claim 8 wherein the decision tree is an ensemble of decision trees.

13. The apparatus as described in claim 12 wherein the ensemble is one of: an adaptive boosting regressor, a random forest regressor, and a gradient boosting regressor.

14. The apparatus as described in claim 8, wherein the processor and the computer memory are located in a cloud computing environment.

15. A computer program product in a non-transitory computer readable medium for use in a data processing system to provide privacy-preserving homomorphic inferencing with respect to a decision tree, the computer program product holding computer program instructions that, when executed by the data processing system, are configured to:
   train a neural network model to learn one or more decision boundaries of the decision tree, the neural network model having low depth and being trained without requiring access to a data set originally used to train the decision tree; and
   perform cryptographic-based homomorphic inferencing on the low depth neural network model in lieu of the decision tree;
   wherein performing cryptographic-based homomorphic inferencing includes:
      encrypting the neural network model with a public key of a client;
      receiving from the client an encrypted inference query;
      applying the encrypted neural network model to the encrypted inference query without decrypting the query; and
      returning to the client, as a response to the encrypted inference query, an encrypted result.

16. The computer program product as described in claim 15 wherein the computer program instructions configured to train the neural network model are further configured to:
   apply a random data set to the decision tree, the random data set matching distribution characteristics of the data set, and to obtain corresponding regression outputs from applying the random data set; and
   use the random data set and the regression outputs to train the neural network model;

wherein, following the training, outputs from the trained neural network model substantially match outputs expected to be obtained from applying the data set to the decision tree.

17. The computer program product as described claim 16 wherein the distribution characteristics comprise training statistics.

18. The computer program product as described in claim 17 wherein the training statistics are one of: a minimum feature value, a maximum feature value, a feature-wise mean, and a variance.

19. The computer program product as described in claim 15 wherein the decision tree is an ensemble of decision trees.

20. The computer program product as described in claim 19 wherein the ensemble is one of: an adaptive boosting regressor, a random forest regressor, and a gradient boosting regressor.

21. The computer program product as described in claim 15 wherein the data processing system is located in a cloud computing environment.

22. A method of machine learning-as-a-service from a cloud computing infrastructure, comprising:
providing a neural network, the neural network constructed as a proxy for a decision tree-based regression model, the neural network having been trained using a data set, together with corresponding predicted outputs generated from applying the data set to the model, the data set bounded by one or more distribution characteristics associated with training data;
encrypting the neural network with a public key of a client;
receiving from the client an encrypted inference query;
without decrypting the encrypted inference query, applying the encrypted neural network to the encrypted inference query to generate an encrypted result; and
returning to the client, as a response to the encrypted inference query, the encrypted result;
wherein the encrypted inference query and the response to the encrypted inference query are ciphertexts.

23. The method as described in claim 22 wherein the decision tree-based regression model is an ensemble of decision trees.

24. The method as described in claim 23 wherein the ensemble is one of: an adaptive boosting regressor, a random forest regressor, and a gradient boosting regressor.

25. The method as described in claim 22 wherein the neural network is a shallow neural network that has an input layer, an output layer, and three or less than three hidden layers.

* * * * *